US012107345B2

(12) United States Patent
Sudo et al.

(10) Patent No.: US 12,107,345 B2
(45) Date of Patent: Oct. 1, 2024

(54) ANTENNA DEVICE

(71) Applicant: Murata Manufacturing Co., Ltd., Kyoto (JP)

(72) Inventors: Kaoru Sudo, Kyoto (JP); Kengo Onaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/184,900

(22) Filed: Mar. 16, 2023

(65) Prior Publication Data

US 2023/0223691 A1 Jul. 13, 2023

Related U.S. Application Data

(63) Continuation of application No. 17/140,388, filed on Jan. 4, 2021, now Pat. No. 11,631,936, which is a (Continued)

(30) Foreign Application Priority Data

Aug. 2, 2018 (JP) ................................ 2018-145934

(51) Int. Cl.
*H01Q 1/48* (2006.01)
*H01Q 1/22* (2006.01)
(Continued)

(52) U.S. Cl.
CPC ............. *H01Q 5/35* (2015.01); *H01Q 1/2208* (2013.01); *H01Q 1/48* (2013.01); *H01Q 5/28* (2015.01);
(Continued)

(58) Field of Classification Search
CPC .......... H01Q 5/35; H01Q 1/2208; H01Q 1/48; H01Q 5/28; H01Q 5/378; H01Q 9/0414; H01Q 9/045; H01Q 21/08
See application file for complete search history.

(56) References Cited

U.S. PATENT DOCUMENTS 4,401,988 A 8/1983 Kaloi
6,069,586 A 5/2000 Karlsson et al.
(Continued)

FOREIGN PATENT DOCUMENTS

CN 203850436 U 9/2014
CN 107046183 A 8/2017
(Continued)

OTHER PUBLICATIONS

International Search Report for PCT/JP2019/029672 dated Sep. 3, 2019.
Written Opinion issued for PCT/JP2019/029672 dated Sep. 3, 2019.

*Primary Examiner* — Dieu Hien T Duong
(74) *Attorney, Agent, or Firm* — Pearne & Gordon LLP

(57) ABSTRACT

An antenna device includes a ground electrode, a feed element, and a parasitic element. The ground electrode has a substantially non-square rectangular plane shape that includes a first side extending in a first direction and a second side extending in a second direction orthogonal to the first direction. The feed element has a substantially rectangular plane shape and is formed in such a way that each side of the feed element becomes parallel to the first direction or the second direction. The parasitic element is formed in such a manner as to face a side of the feed element parallel to the first side. The feed element is configured to radiate a first polarized wave that excites in the first direction and a second polarized wave that excites in the second direction. The length of the first side is longer than the length of the second side.

14 Claims, 12 Drawing Sheets

Related U.S. Application Data continuation of application No. PCT/JP2019/029672, filed on Jul. 29, 2019.

(51) Int. Cl.

| | |
|---|---|
| ***H01Q 5/28*** | (2015.01) |
| ***H01Q 5/35*** | (2015.01) |
| ***H01Q 5/378*** | (2015.01) |
| ***H01Q 9/04*** | (2006.01) |
| ***H01Q 21/08*** | (2006.01) |

(52) U.S. Cl.

CPC ........... *H01Q 5/378* (2015.01); *H01Q 9/0414* (2013.01); *H01Q 9/045* (2013.01); *H01Q 21/08* (2013.01)

(56) References Cited

U.S. PATENT DOCUMENTS

| | | | | |
|---|---|---|---|---|
| 6,118,406 | A * | 9/2000 | Josypenko | H01Q 9/0414 343/700 MS |
| 2008/0088510 | A1 | 4/2008 | Murata et al. | |
| 2010/0117916 | A1 | 5/2010 | Gustafsson et al. | |
| 2018/0115056 | A1 | 4/2018 | Rashidian | |
| 2020/0144729 | A1 | 5/2020 | Suzuki et al. | |
| 2020/0373666 | A1 * | 11/2020 | Takaki | H01Q 5/307 |

FOREIGN PATENT DOCUMENTS

| | | | | |
|---|---|---|---|---|
| JP | 2002-158534 | A | | 5/2002 |
| JP | 2002271131 | A | * | 9/2002 |
| JP | 2003-008337 | A | | 1/2003 |
| JP | 2007-074575 | A | | 3/2007 |
| JP | 2008-312263 | A | | 12/2008 |
| JP | 2010-524331 | A | | 7/2010 |
| JP | 2016-092713 | A | | 5/2016 |
| JP | 2016-174291 | A | | 9/2016 |
| JP | 2017139686 | A | * | 8/2017 |
| JP | 2018-063159 | A | | 4/2018 |
| KR | 2004-04222 | Y1 | | 12/2005 |

* cited by examiner

ANTENNA DEVICE

CROSS REFERENCE TO RELATED APPLICATION

This is a continuation of U.S. Ser. No. 17/140,388 filed on Jan. 4, 2021, which is a continuation of International Application No. PCT/JP2019/029672 filed on Jul. 29, 2019 which claims priority from Japanese Patent Application No. 2018-145934 filed on Aug. 2, 2018. The contents of these applications are incorporated herein by reference in their entireties.

BACKGROUND OF THE DISCLOSURE

Field of the Disclosure

The present disclosure relates to antenna devices and more specifically to a technique that improves characteristics of an antenna device with parasitic elements.

Description of the Related Art

In flat plate shape patch antennas, a configuration that adjusts antenna characteristics by arranging passive elements (parasitic elements) around a feed element is known.

Japanese Unexamined Patent Application Publication No. 2008-312263 (Patent Document 1) discloses, in a microstrip antenna having a flat plate shape, a configuration in which a plurality of passive elements are arranged around a feed element and the passive element is selectively connected to an earth electrode using a switch. In the configuration of Japanese Unexamined Patent Application Publication No. 2008-312263 (Patent Document 1), the beam direction of a radio wave being radiated from an antenna can be adjusted by changing the passive element to be connected to the earth electrode.

Japanese Unexamined Patent Application Publication No. 2003-8337 (Patent Document 2) discloses, in a microstrip antenna configured to radiate two polarized waves which are a vertically polarized wave and a horizontally polarized wave, a configuration in which line-like passive elements are arranged in such a manner as to abut the right and left sides and the up and down sides of a flat plate-like square ground conductor. In the configuration of Japanese Unexamined Patent Application Publication No. 2003-8337 (Patent Document 2), the horizontal plane half-value angle and the vertical plane half-value angle can be matched for each of the vertically polarized wave and the horizontally polarized wave by adjusting the length and width of the passive element and the gap between the passive elements, thereby enabling the homogenization of transmission and reception areas of both the polarized waves.

Patent Document 1: Japanese Unexamined Patent Application Publication No. 2008-312263

Patent Document 2: Japanese Unexamined Patent Application Publication No. 2003-8337

BRIEF SUMMARY OF THE DISCLOSURE

In general, the frequency band of a radio wave being radiated from a patch antenna can be broadened by arranging passive elements (parasitic elements) around a feed element of the patch antenna. However, in the case where a sufficient ground contact area cannot be secured with respect to the size of a radiating element (feed element+passive element) because of a constraint on the size of a dielectric substrate on or in which the feed element is arranged or any other similar constraint, the beam width of a radio wave radiated from an antenna becomes narrower compared with the case where the ground contact area is sufficiently large, and there may be a case where desired antenna characteristics cannot be obtained.

The present disclosure is made to resolve such issues, and an object thereof is to realize, in an antenna device capable of radiating a plurality of polarized waves, both broadening of the band width of the frequency band and widening of the angle of the beam width in a balanced manner in the case where there is a constraint on the substrate size.

An antenna device according to the present disclosure includes a ground electrode, a feed element, and a parasitic element. The ground electrode has a substantially non-square rectangular plane shape that includes a first side extending in a first direction and a second side extending in a second direction, the second direction being orthogonal to the first direction. The feed element has a substantially rectangular plane shape and is formed in such a way that each side of the feed element becomes parallel to the first direction or the second direction. The parasitic element is formed in such a manner as to face a side of the feed element, the side of the feed element being parallel to the first side in a plan view of the antenna device viewed from a normal direction of the feed element. The feed element is configured to radiate a first polarized wave that excites in the first direction and a second polarized wave that excites in the second direction. The length of the first side is longer than the length of the second side.

In the antenna device according to the present disclosure, the parasitic element is arranged for the polarized wave (first polarization) whose excitation direction is in the long side (first side) direction of the feed element arranged in such a manner as to face the ground electrode having a non-square rectangular shape, and no parasitic element is arranged for the polarized wave (second polarization) whose excitation direction is in the short side (second side) direction of the feed element. This enables to suppress the narrowing of the beam width for the polarized wave (second polarization) whose excitation direction is in a direction where the constraint on the size of the dielectric substrate is comparatively severe, and broaden the band width for the polarized wave (first polarization) whose excitation direction is in a direction where the constraint on the size of the dielectric substrate is comparatively less severe, using the parasitic element. Accordingly, it becomes possible to realize, in the antenna device capable of radiating a plurality of polarized waves, both the broadening of the band width of the frequency band and the widening of the angle of the beam width in a balanced manner in the case where there is the constraint on the substrate size.

DETAILED DESCRIPTION OF THE DISCLOSURE

Figure 1:
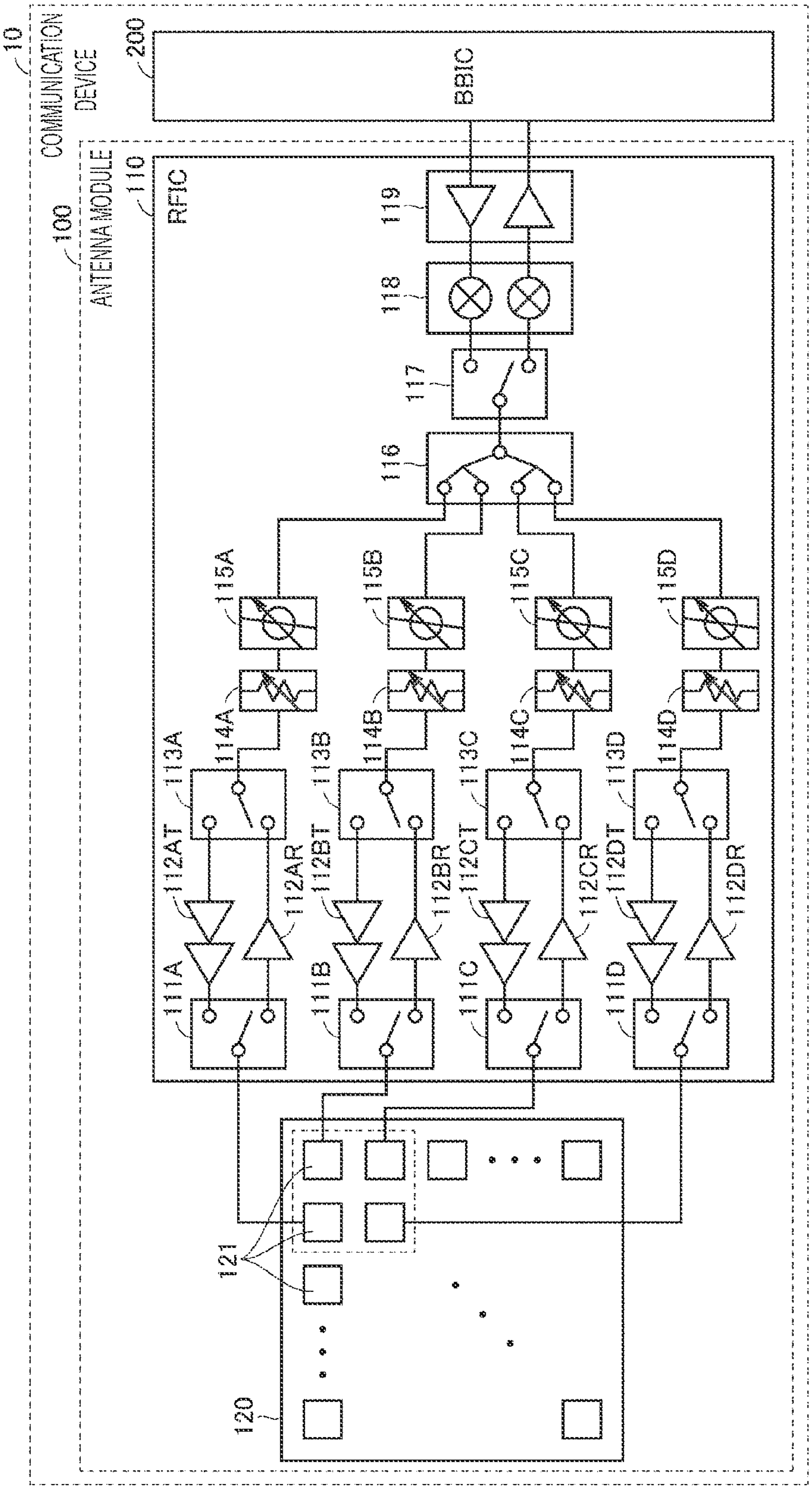
FIG. 1 is a block diagram of a communication device to which an antenna device according to an embodiment 1 is applied.

Hereinafter, embodiments of the present disclosure will be described in detail with reference to the drawings. Note that the same reference codes are assigned to the same or corresponding parts in the drawings, and the description thereof will not be repeated.

Embodiment 1

(Basic Configuration of Communication Device)

FIG. 1 is an example of a block diagram of a communication device 10 to which an antenna device 120 according to the embodiment 1 is applied. The communication device 10 is, for example, a mobile phone, a mobile terminal such as a smartphone, a tablet, or the like, a personal computer with a communication function, or the like.

Referring to FIG. 1, the communication device 10 includes an antenna module 100 and a BBIC 200 that makes up a baseband signal processing circuit. The antenna module 100 includes a RFIC 110 that is an example of a feed circuit and the antenna device 120. The communication device 10 up-converts a signal sent from the BBIC 200 to the antenna module 100 into a radio frequency signal and radiates the radio frequency signal from the antenna device 120, and down-converts a radio frequency signal received by the antenna device 120 and performs processing on the signal in the BBIC 200.

In FIG. 1, for ease of description, of a plurality of feed elements 121 that makes up the antenna device 120, only a configuration corresponding to four feed elements 121 is illustrated, and configurations corresponding to other feed elements 121, which have a similar configuration, are omitted. Note that in FIG. 1, an example is described in which the antenna device 120 is formed using the plurality of feed elements 121 arranged in a two-dimensional array shape. However, it is not necessarily to have a plurality of the feed elements 121, and the antenna device 120 may alternatively be formed from a single feed element 121. In the present embodiment, the feed element 121 is a patch antenna having a substantially square flat plate shape. Alternatively, the shape of the feed element 121 may be a substantially non-square rectangular shape.

The RFIC 110 includes switches 111A to 111D, 113A to 113D, and 117, power amplifier 112AT to 112DT, low noise amplifiers 112AR to 112DR, attenuators 114A to 114D, phase shifters 115A to 115D, a signal multiplexer/demultiplexer 116, a mixer 118, and an amplifier circuit 119.

When a radio frequency signal is transmitted, the switches 111A to 111D and 113A to 113D are switched to power amplifiers 112AT to 112DT sides, and the switch 117 is connected to a transmitting side amplifier of the amplifier circuit 119. When a radio frequency signal is received, the switches 111A to 111D and 113A to 113D are switched to low noise amplifiers 112AR to 112DR sides, and the switch 117 is connected to a receiving side amplifier of the amplifier circuit 119.

A signal sent from the BBIC 200 is amplified in the amplifier circuit 119 and up-converted in the mixer 118. A transmitting signal that is an up-converted radio frequency signal is split into four signals in the signal multiplexer/demultiplexer 116, and these four signals are fed to different feed elements 121 after traveling through four signal paths, respectively. At this time, the directivity of the antenna device 120 can be adjusted by individually adjusting the degree of phase shift in the phase shifters 115A to 115D that are arranged in the respective signal paths.

Received signals that are radio frequency signals received by the respective feed elements 121 are sent to the signal multiplexer/demultiplexer 116 via the four different signal paths respectively and multiplexed in the signal multiplexer/demultiplexer 116. A multiplexed received signal is down-converted in the mixer 118, amplified in the amplifier circuit 119, and sent to the BBIC 200.

The RFIC 110 is formed as, for example, a one-chip integrated circuit component including the foregoing circuit configuration. Alternatively, for each feed element 121, devices (switch, power amplifier, low noise amplifier, attenuator, and phase shifter) corresponding to the feed element 121 in the RFIC 110 may be formed as a one-chip integrated circuit component.

(Structure of Antenna Module)

Figure 2A:
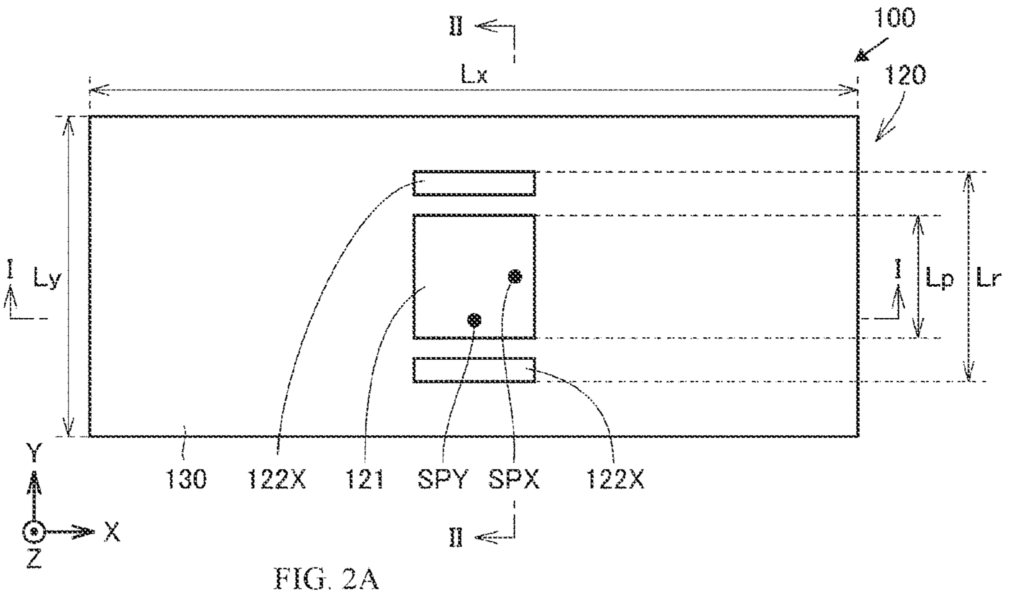
FIGS. 2A, 2B and 2C illustrate a plan view and cross-sectional views of an antenna module of FIG. 1.
Figure 2B:
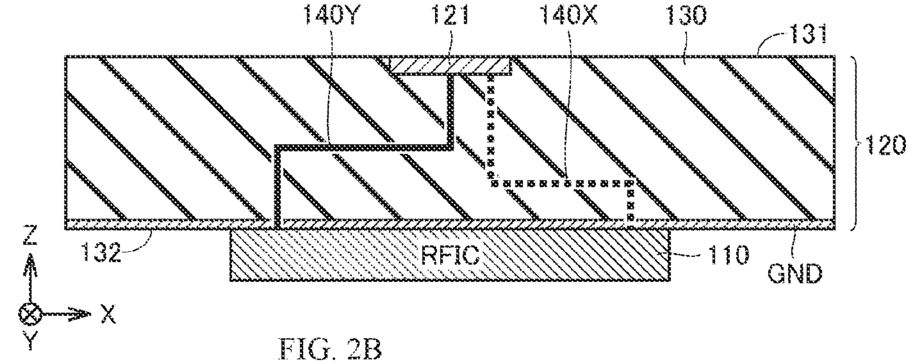
Figure 2C:
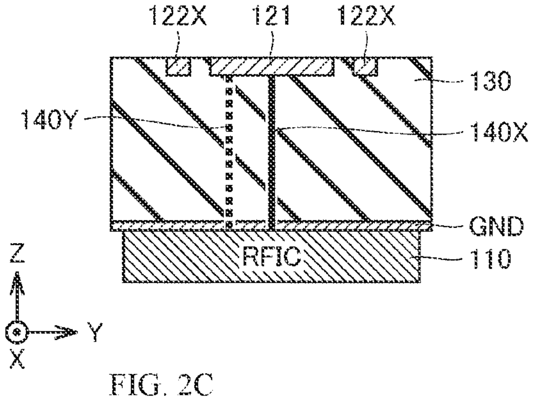

A more detailed structure of the antenna module 100 is described using FIGS. 2A, 2B and 2C. FIG. 2A illustrates a plan view of the antenna module 100. FIG. 2B and FIG. 2C illustrate cross-sectional views at line I-I and line II-II of FIG. 2A, respectively.

Referring to FIGS. 2A, 2B and 2C, the antenna device 120 in the antenna module 100 includes, in addition to the feed elements 121, parasitic elements 122X that are passive elements, a dielectric substrate 130, feed lines 140X and 140Y, and a ground electrode GND.

Note that in FIGS. 2A, 2B and 2C and in FIG. 3 and FIG. 11A to FIG. 13D which will be described later, for ease of description, the case where only one feed element 121 is arranged in the antenna device 120 is described. However, as illustrated in the antenna device of FIG. 5, FIG. 7, FIG. 9, and FIG. 10, the configuration may alternatively be such that a plurality of the feed elements 121 is arranged in an array shape. Furthermore, in the following description, the feed element 121 and the passive element are collectively referred to as a "radiating element" in some cases.

The dielectric substrate 130 is, for example, a substrate in which resin such as epoxy, polyimide, or the like is formed in a multilayer structure. The dielectric substrate 130 may alternatively be made of liquid crystal polymer (LCP) having a lower dielectric constant, fluorine resin, low temperature cofired ceramics (LTCC), or the like. Furthermore, the dielectric substrate 130 may be a flexible substrate having flexibility.

Note that in the dielectric substrate, the multilayer structure is not an essential configuration. For example, in the case where the radiating element and the ground electrode are formed not inside the dielectric substrate but on a top surface and/or a back surface of the dielectric substrate and the radiating element and the ground electrode are connected only by vias, the dielectric substrate may have a single layer structure.

The dielectric substrate 130 has a substantially non-square rectangular plane shape and has a first side extending in the X-axis direction (first direction) of FIGS. 2A, 2B and 2C and a second side extending in the Y-axis direction (second direction) orthogonal to the X-axis. The first side is the long side of the non-square rectangle and has a length of Lx. The second side is the short side of the non-square rectangle and has a length of Ly. The ground electrode GND having substantially the same plane shape as the dielectric substrate 130 is formed on the back surface 132 side of the dielectric substrate 130. Alternatively, the ground electrode GND may be formed on or in an inner layer close to a back surface 132 of the dielectric substrate 130.

The RFIC 110 is arranged on the back surface 132 of the dielectric substrate 130 with electrically conductive members such as solder bumps (not illustrated) interposed therebetween.

The feed element 121 is formed at or near a center part of a top surface 131 of the dielectric substrate 130 in such a way that each side of the feed element 121 becomes parallel to the X-axis direction or the Y-axis direction. The feed lines 140X and 140Y send a radio frequency signal supplied from the RFIC 110 to the feed element 121. The feed line 140X is connected to a feed point SPX of the feed element 121, and the feed line 140Y is connected to a feed point SPY of the feed element 121.

The feed point SPX is provided at a position shifted to the X-axis positive direction from the center of the feed element 121. By supplying a radio frequency signal from the RFIC 110 via the feed line 140X, a polarized wave (first polarization) whose excitation direction is in the X-axis direction is radiated from the feed element 121. The feed point SPY is provided at a position shifted to the Y-axis negative direction from the center of the feed element 121 (that is to say, a position obtained by rotating the feed point SPX 90 degrees in a counterclockwise direction about the center of the feed element 121). By supplying a radio frequency signal from the RFIC 110 via the feed line 140Y, a polarized wave (second polarization) whose excitation direction is in the Y-axis direction is radiated from the feed element 121.

The parasitic element 122X (first parasitic element) is formed at a position in such a manner as to face the side of the feed element 121 parallel to the X-axis direction and to be separated from the feed element 121 by a predetermined distance. By providing such parasitic element 122X, it becomes possible to broaden the frequency band width of the first polarized wave whose excitation direction is in the X-axis direction.

In general, characteristics required for antennas include broadening of the band width of the frequency band of a radio wave being radiated from an antenna, widening of frequencies of the radiating region (widening of the angle of the beam width), and heightening of the gain (gain increase) of a radio wave being radiated. Of these, when looking at a relationship between the beam width and the gain, if the power (that is, energy) supplied to an antenna is the same, the maximum gain increases as the beam width becomes narrower, and the maximum gain decreases as the beam width becomes wider. Thus, the beam width and the gain are in a trade-off relationship. Furthermore, it is known that the beam width relates to the antenna size. The beam width becomes narrower as the antenna size increases, and the beam width becomes wider as the antenna size decreases.

Here, although the antenna size is determined by the physical dimension of a radiating element, the antenna size is also affected by the relative size ratio between the radiating element and the dielectric substrate (ground electrode). For example, in the case where the size of the radiating element is the same, the antenna size becomes relatively smaller if the ground electrode is sufficiently large, whereas the antenna size becomes relatively larger if the ground electrode is smaller. Accordingly, even with the same radiating element size, the beam width becomes narrower as the substrate (ground electrode) becomes smaller and the antenna size becomes relatively larger. Therefore, as in the antenna module 100 illustrated in FIGS. 2A, 2B and 2C, in the case where the dimension Ly in the Y-axis direction of the dielectric substrate 130 is not sufficiently large compared with the dimension of the feed element 121, the beam width of the second polarized wave that excites in the Y-axis direction may become narrower as the size of the radiating element (feed element+parasitic element) increases.

Assuming S is the radiating area of a radiating element of an antenna and λ is the wavelength of a radio wave being radiated, the maximum gain G of a radio wave being radiated from the antenna can be generally expressed by the following equation (1).

$$G=4\pi S/\lambda^2 \tag{1}$$

As described above, the beam width becomes narrower as the gain of the antenna increases, and thus the beam width becomes narrower as the radiating area S (that is, the antenna size) becomes larger.

In view of the above, in the present embodiment 1, with regard to the direction where the constraint on the size of the dielectric substrate is comparatively less severe, the band width is broadened by providing the parasitic element. On the other hand, with regard to the direction where the constraint on the size of the dielectric substrate is more severe, the narrowing of the beam width is suppressed by providing no parasitic element.

Figure 3:
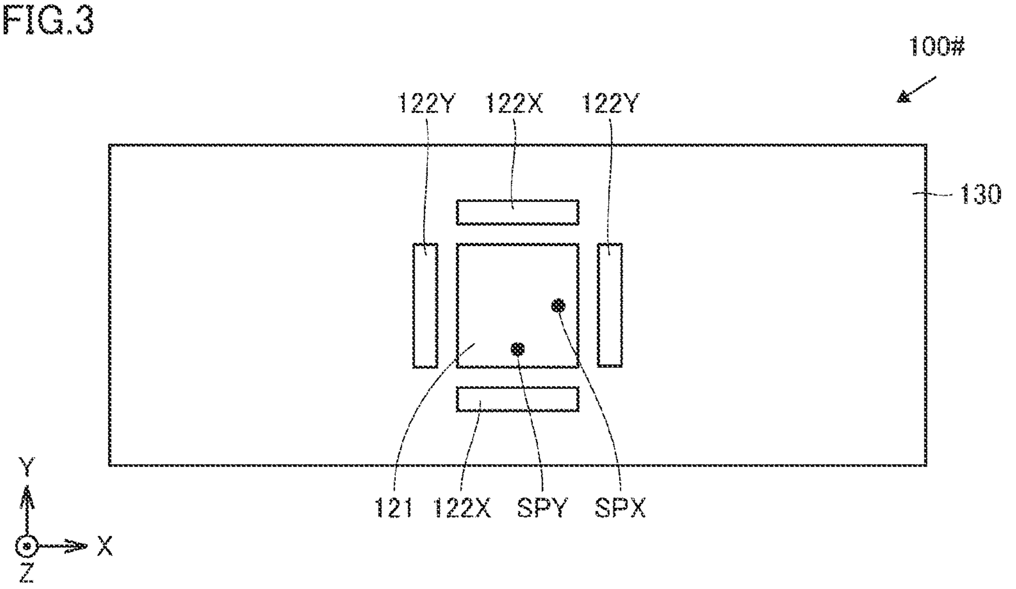
FIG. 3 is a plan view of an antenna module of a comparative example 1.

As a comparative example 1, FIG. 3 illustrates a plan view of an antenna module 100 # that includes parasitic elements 122Y for the second polarized wave whose excitation direction is in the Y-axis direction in addition to the configuration of FIG. 2. That is to say, in the antenna module 100 # of the comparative example 1, the parasitic elements 122Y are additionally formed at positions that face the sides of the feed elements 121 parallel to the Y-axis direction.

Figure 4:
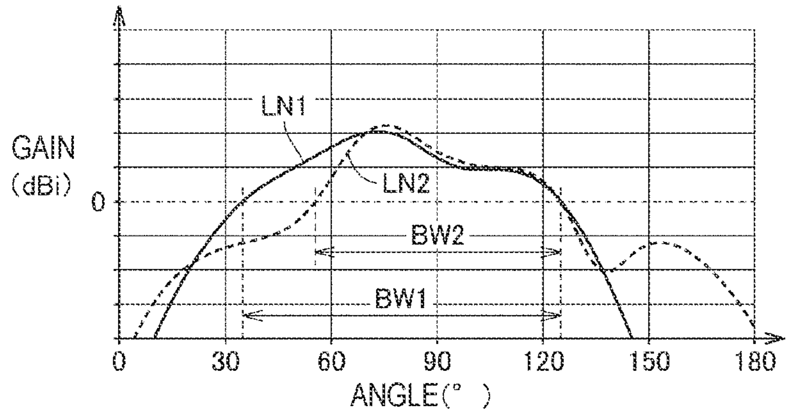
FIG. 4 is a diagram for illustrating a difference in an antenna characteristic between the antenna modules of the embodiment 1 and the comparative example.

FIG. 4 is a diagram illustrating the relationship between the radiation angle of a radio wave and the gain in the cases of the embodiment 1 illustrated in FIGS. 2A, 2B and 2C and the comparative example 1 illustrated in FIG. 3. The horizontal axis of FIG. 4 indicates the angle between the radiation plane of the feed element 121 and the radiation direction of a radio wave, and the vertical axis indicates the gain. With regard to the radiation angle in the horizontal axis, 90 degrees correspond to the normal direction of the feed element 121. Note that in FIG. 4, a solid line LN1 is a simulation result in the case of the embodiment 1, and a dashed line LN2 is a simulation result in the case of the comparative example 1.

Referring to FIG. 4, when the radiation angle at which the gain exceeds 0 dBi is defined as the beam width, a beam width BW1 in the case of the embodiment 1 is broader than a beam width BW2 in the case of the comparative example 1. As described above, by providing no parasitic element for the polarized wave in the direction where the constraint on the size of the dielectric substrate become more severe, the narrowing of the beam width of this polarized wave can be suppressed.

Note that when λg is defined as an effective wavelength of a radio wave being radiated taking account of the dielectric constant of the dielectric substrate 130, Lp that is the length of a side of the feed element 121 having a square shape can be expressed as approximately λg/2 (Lp λg/2). In this case, the dimension Ly of the dielectric substrate 130 in the Y-axis direction that affects the beam width of a radio wave being radiated is approximately twice the length of a side of the feed element 121. That is to say, the range of the size of the dielectric substrate within which the beam width is limited is $\lambda g/2<Ly<\lambda g$. More specifically, when the parasitic elements 122X for the polarized wave in the X-axis direction are considered, the range of the size of the dielectric substrate within which the beam width is limited can be expressed as $Lr<Ly<\lambda g$, where Lr is the dimension between the parasitic elements 122X as illustrated in FIGS. 2A, 2B and 2C.

Embodiment 2

In the embodiment 1, the example is described in which only one feed element is arranged in the antenna device.

In the embodiment 2, an example in which a plurality of feed elements is arranged in an array shape is described. In an array antenna, by adjusting the phases of radio frequency power supplied to adjacent feed elements, it becomes possible to use beamforming that changes the directivity (radiation angle) of a radio wave being radiated from the entire antenna.

Figure 5:
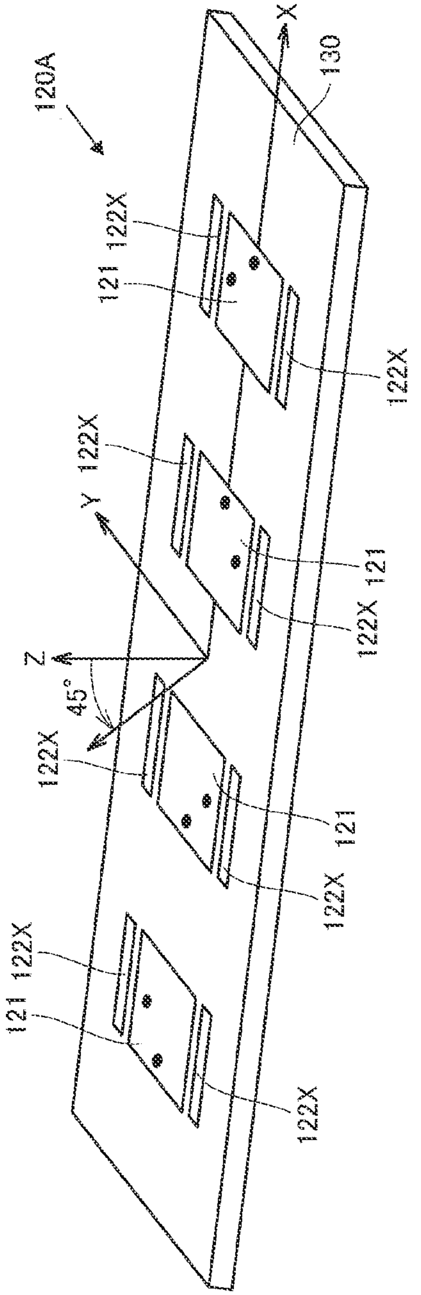
FIG. 5 is a perspective view of an antenna device according to an embodiment 2.

FIG. 5 is a perspective view of an antenna device 120A according to the embodiment 2. Note that in FIG. 5, the RFIC 110 is not illustrated.

Referring to FIG. 5, in the antenna device 120A, four feed elements 121 are arranged on the dielectric substrate 130 in line along the X-axis direction. Furthermore, for each feed element 121, the parasitic elements 122X are formed at positions that face the sides of the feed element 121 parallel to the X-axis direction. Note that in the example of FIG. 5, the positions of the feed points of one feed element match positions obtained by rotating the positions of the feed points of an adjacent feed element 90 degrees. However, the positions of the feed points of all the feed elements may be equal to each other.

In such array antenna, as described above, by adjusting the phases of radio frequency power supplied to adjacent feed elements, it becomes possible to change the directivity (radiation angle) of a radio wave being radiated from the entire antenna. However, if the beam width of a radio wave being radiated from each feed element becomes narrower, in some cases, it becomes difficult to secure the gain at a desired radiation angle.

Figure 6A:
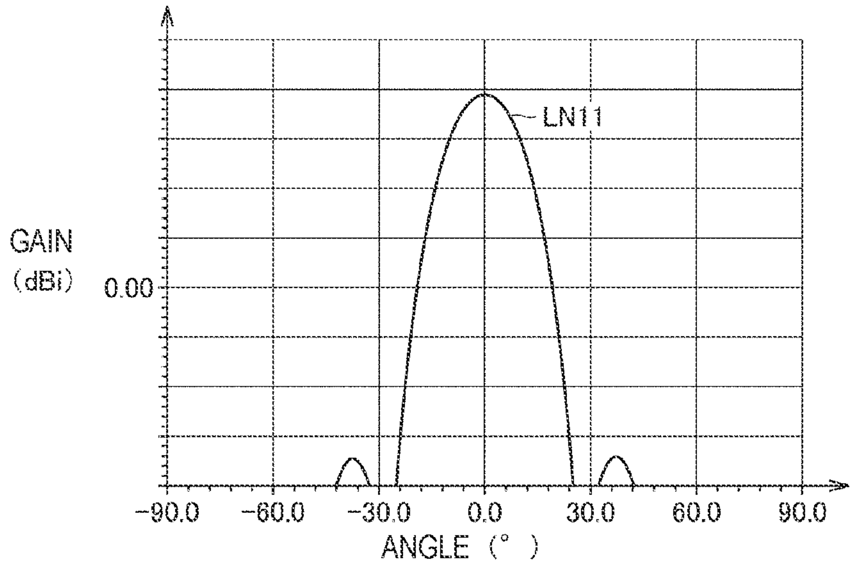
FIGS. 6A and 6B illustrate diagrams for illustrating a gain characteristic of beamforming in the antenna device of FIG. 5.
Figure 6B:
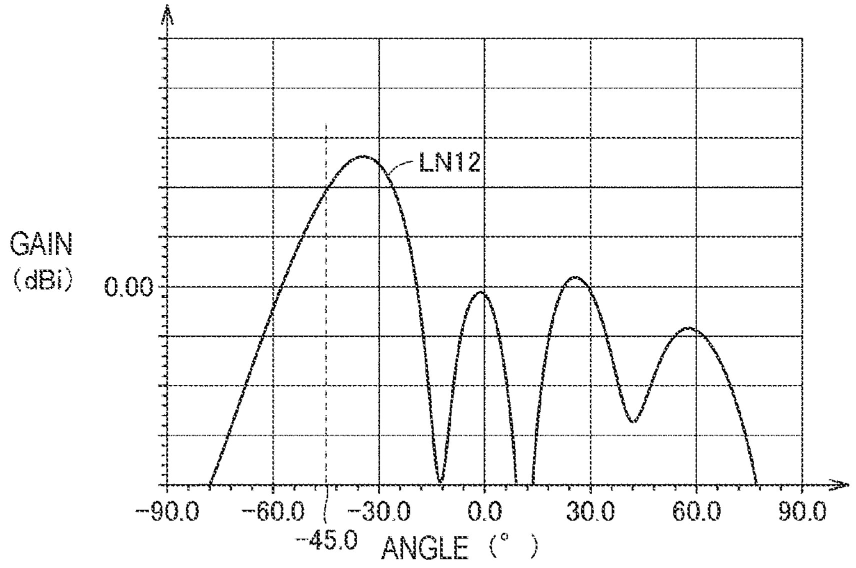

FIGS. 6A and 6B illustrate diagrams illustrating examples of the gain characteristic when the radiation angle is changed using the beamforming in the antenna device 120A illustrated in FIG. 5. FIG. 6A is an example illustrating the gain characteristic (the solid line LN11) when the radiation direction is set to the normal direction of the dielectric substrate 130 (that is, the Z-axis direction), and FIG. 6B is an example illustrating the gain characteristic (the solid line LN12) when the radiation direction is set to a direction of −45 degrees from the Z-axis in the X-Z plane. As illustrated in FIGS. 6A and 6B, in both the case (FIG. 6A) where the radiation angle is 0 degrees (that is, the normal direction) and the case (FIG. 6B) where the radiation angle is −45 degrees, the gains at these radiation angles are greater than 0 dBi.

Figure 7:
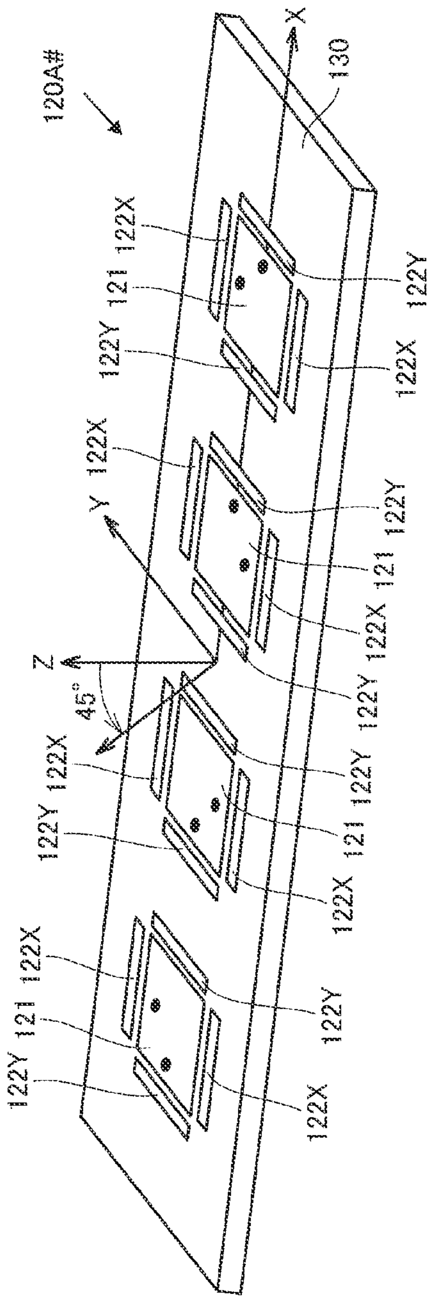
FIG. 7 is a perspective view of an antenna device of a comparative example 2.
Figure 8A:
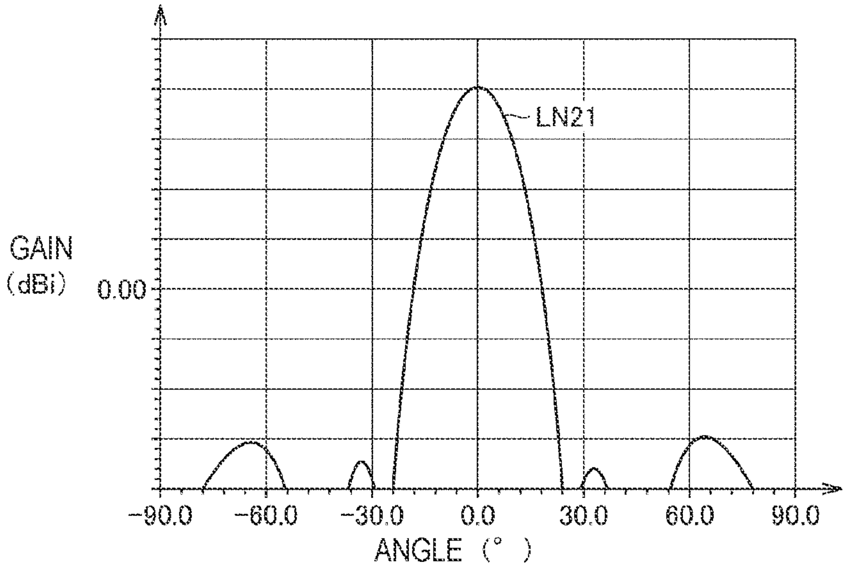
FIGS. 8A and 8B illustrate diagrams for illustrating a gain characteristic of beamforming in the antenna device of FIG. 7.
Figure 8B:
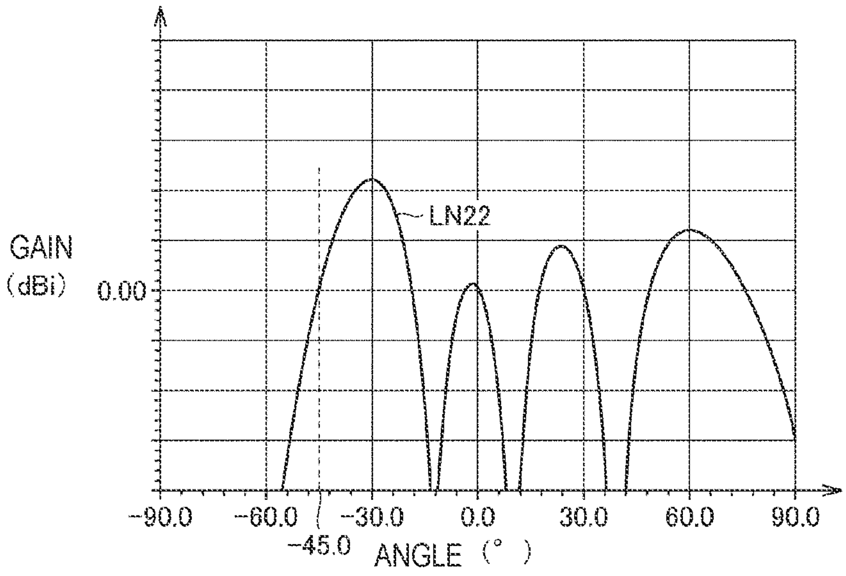
Figure 9:
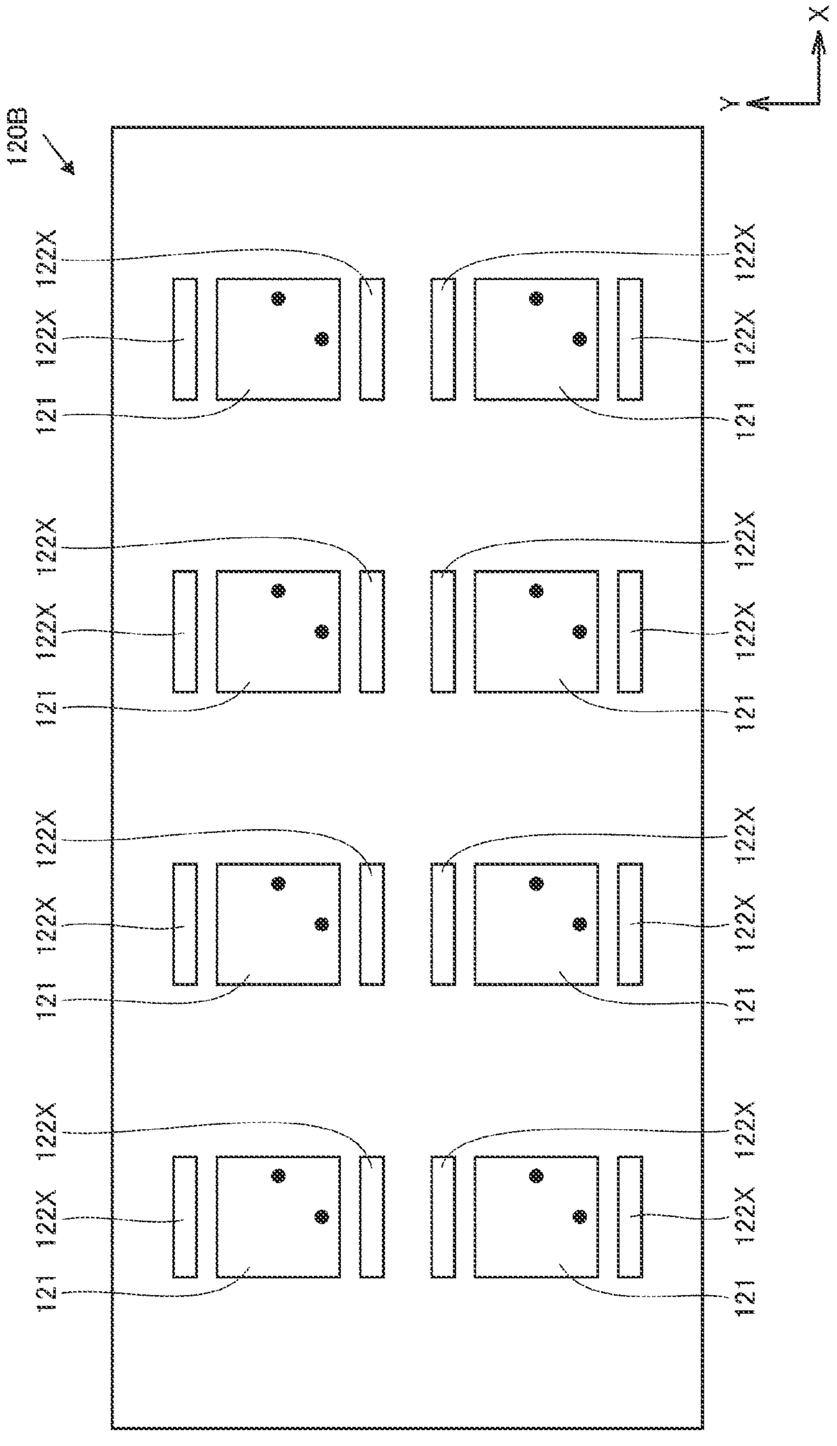
FIG. 9 is a plan view of an antenna device of a modified example.

On the other hand, as in an antenna device 120A # of a comparative example 2 illustrated in FIG. 7, in the configuration in which the parasitic elements 122Y for the polarized wave in the Y-axis direction are additionally arranged for each feed element 121, a sufficient gain is secured when the radiation angle is 0 degrees (the solid line L21 of FIG. 8A). However, when the radiation angle is −45 degrees, the gain at this radiation angle decreases to a level close to 0 dBi (the solid line L22 of FIG. 8B).

As described above, in the array antenna, by providing no parasitic element for the polarized wave in the direction where the constraint on the size of the dielectric substrate become more severe, it becomes possible to secure the gain when the radiation angle is varied using the beamforming.

Note that in the example of FIG. 5, the case of the array antenna in which a plurality of feed elements is arranged one-dimensionally is described. However, as in an antenna device 120B illustrated in FIG. 9, the same applies to the case with an array antenna having a two-dimensional array structure in which a plurality of feed elements is additionally arrayed in the Y-axis direction. That is to say, in the case where the dimension of the dielectric substrate 130 in the Y-axis direction is smaller than the dimension of the dielectric substrate 130 in the X-axis direction, even when the beamforming is used, the gain can be secured by providing no parasitic element for the polarized wave in the Y-axis direction where the constraint on the size of the dielectric substrate becomes more severe.

Embodiment 3

In the embodiment 2, the example is described in which the dielectric substrate has a plane shape, and the array antenna radiates a radio wave in one direction.

In the embodiment 3, an example is described in which part of the dielectric substrate is bent, and the array antenna is capable of radiating a radio wave in different directions.

Figure 10:
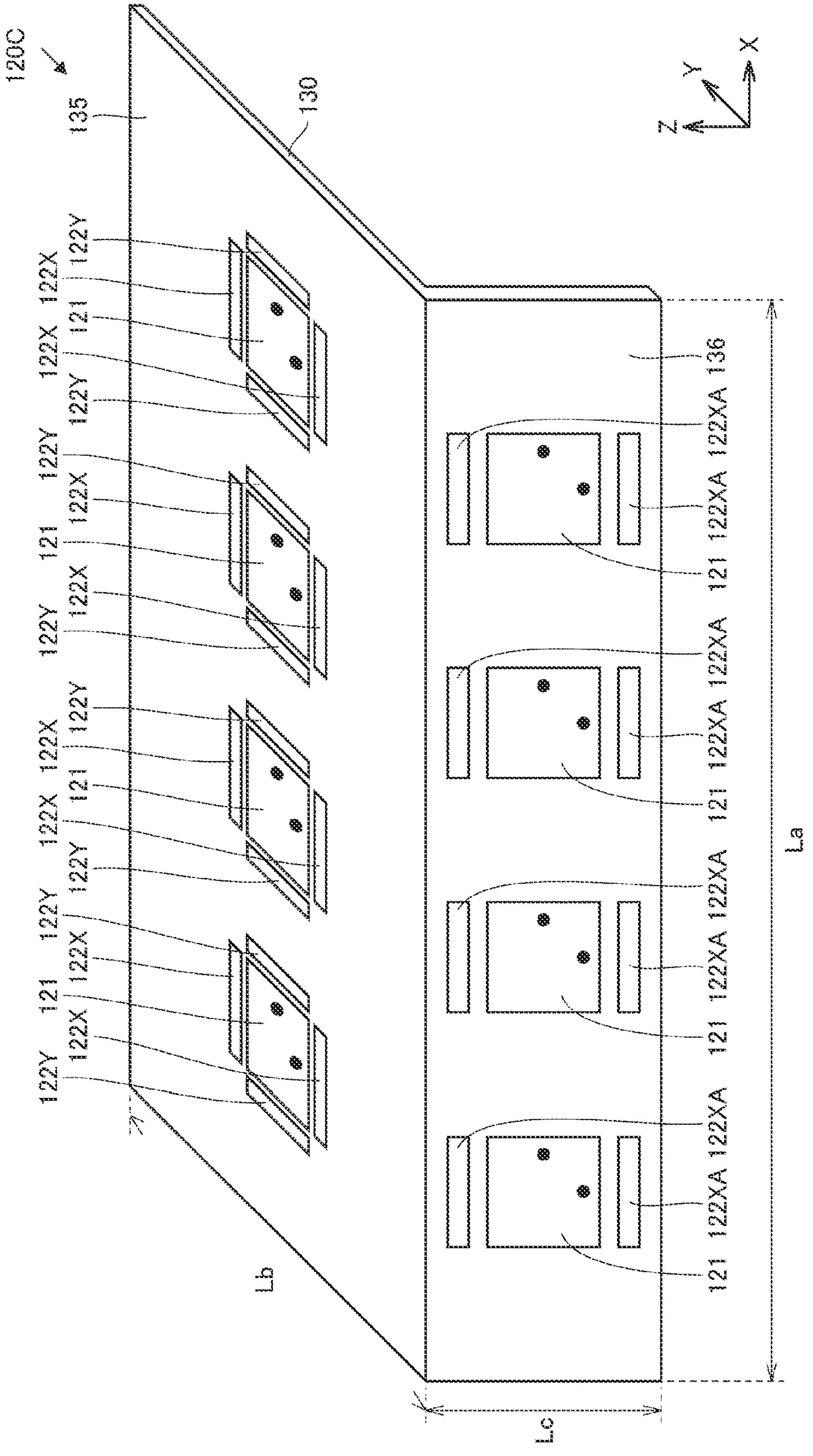
FIG. 10 is a perspective view of an antenna device according to an embodiment 3.

FIG. 10 is a perspective view of an antenna device 120C according to the embodiment 3. In the antenna device 120C, the dielectric substrate 130 includes a first part 135 parallel to the X-Y plane of FIG. 10 and a second part 136 that is bent from an end part of the first part 135 and parallel to the Z-X plane of FIG. 10. The length of a side of the first part 135 along the X-axis direction is La, and the length of a side of the first part 135 along the Y-axis direction is Lb. Furthermore, the length of a side of the second part 136 along the X-axis direction is also La, and the length of a side of the second part 136 along the Z-axis direction is Lc. For example, such an antenna device can be used for a thin mobile terminal such as a smartphone, in which the first part 135 corresponds to an antenna on the principal surface side of a housing on which a display screen is mounted, and the second part 136 corresponds to an antenna on the side surface side of the housing.

Four feed elements 121 arrayed in the X-axis direction are arranged on each of the first part 135 and the second part 136 of the dielectric substrate 130. Furthermore, although not illustrated in FIG. 10, the ground electrode is arranged on the back surface sides of the first part 135 and the second part 136. The normal direction of the feed element 121 (second feed element) arranged on the first part 135 is different from the normal direction of the feed element 121 (first feed element) arranged on the second part 136.

With regard to the feed elements of the first part 135, a polarized wave whose excitation direction is in the X-axis direction and a polarized wave whose excitation direction is in the Y-axis direction are radiated to the positive direction of the Z-axis. With regard to the feed elements of the second part 136, a polarized wave whose excitation direction is in the X-axis direction and a polarized wave whose excitation direction is in the Z-axis direction are radiated to the negative direction of the Y-axis. Note that as described in the embodiment 2, the beamforming enables to adjust the radiation angle of a radiating radio wave from the X-axis direction.

Here, Lb, which is the length of the side of the first part 135 along the Y-axis direction, is sufficiently longer than Lc, which is the length of the side of the second part 136 along the Z-axis direction (Lb>Lc). Furthermore, Lc, which is the length of the side of the second part 136 along the Z-axis direction, is shorter than λg, which is the effective wavelength of the radio wave being radiated in the dielectric substrate 130 (Lc<λg). That is to say, as described in the embodiment 1, the constraint on the size of the dielectric substrate 130 does not affect the beam width in the first part 135. However, for the polarized wave whose excitation direction is in the Z-axis direction, the constraint on the size of the dielectric substrate 130 causes the narrowing of the beam width in the second part 136. Accordingly, for the feed elements 121 of the first part 135, the parasitic elements 122X and 122Y for both the polarized waves are arranged, whereas for the feed elements of the second part 136, only the parasitic elements 122XA for the polarized wave whose excitation direction is in the X-axis direction are arranged, and no parasitic element for the polarized wave whose excitation direction is in the Z-axis direction is arranged.

As described above, in the array antenna capable of radiating a radio wave in different directions in which part of the dielectric substrate is bent, the arrangement of the parasitic elements for each polarized wave is determined based on the size of the dielectric substrate on or in which the feed elements are arranged. This enables to suppress the narrowing of the beam width of a radio wave being radiated from the feed element and realize both the broadening of the band width of the frequency band and the widening of the angle of the beam width in a balanced manner.

Note that in FIG. 10, the example is described in which a plurality of feed elements 121 is arranged on each of the first part 135 and the second part 136 of the dielectric substrate 130. However, only one feed element 121 may be arranged on the first part 135 and/or the second part 136.

Embodiment 4

Basically, the parasitic element is arranged in order to broaden the frequency band width of a radio wave being radiated. As described above, in the case where the constraint on the size of the dielectric substrate is severe, if the narrowing of the angle of the beam width is suppressed by arranging no parasitic element in order to secure a desired gain, there may be the case where a desired frequency band width cannot be realized.

In the embodiment 4, an example is described in which a desired frequency band is realized by providing a stub in the feed line that sends a radio frequency signal from the RFIC to the feed element in the case described above.

Figure 11A:
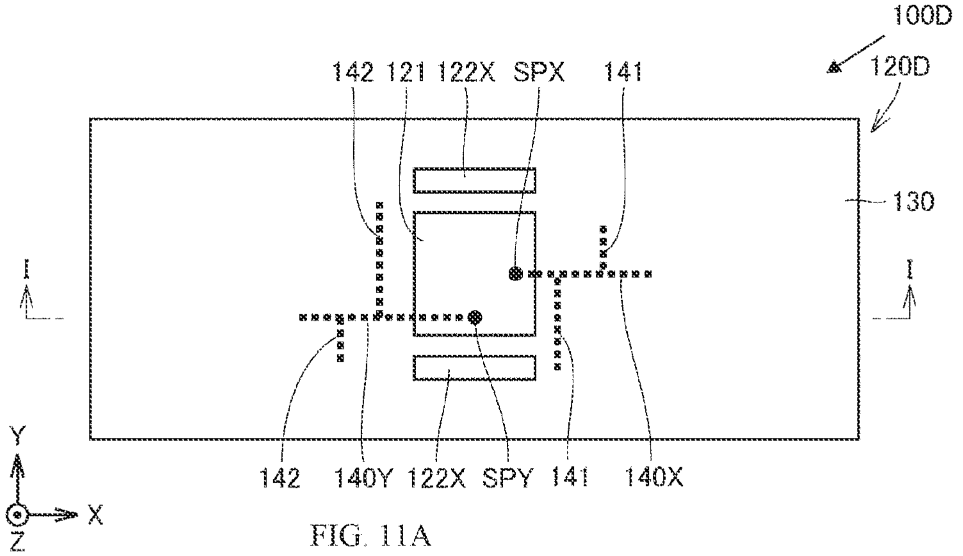
FIGS. 11A and 11B illustrate a plan view and a cross-sectional view of an antenna module including an antenna device according to an embodiment 4.
Figure 11B:
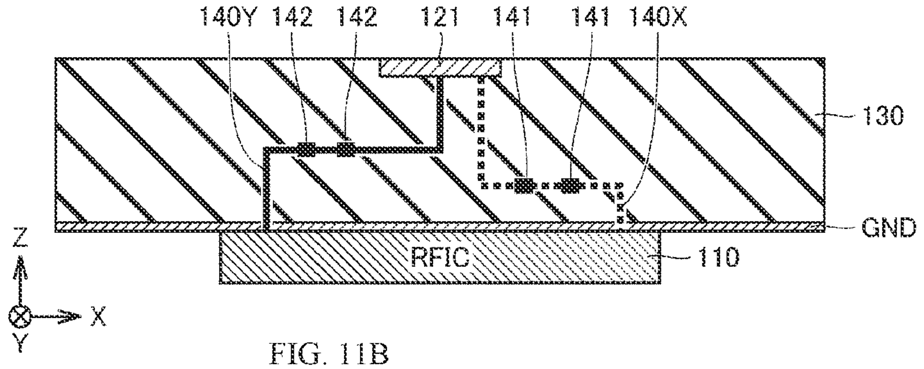

FIGS. 11A and 11B illustrate views illustrating an antenna module 100D including an antenna device 120D according to the embodiment 4. FIG. 11A illustrates a plan view of the antenna module 100D, and FIG. 11B is a cross-sectional view at line I-I of FIG. 11A.

Referring to FIGS. 11A and 11B, the antenna device 120D has a configuration in which, in addition to the configuration of the antenna device 120 illustrated in FIGS. 2A, 2B and 2C, stubs 141 are provided in the feed line 140X and furthermore stubs 142 are provided in the feed line 140Y. The stubs 141 and 142 function as a matching circuit that matches the impedances of the RFIC 110 and the feed element 121. Accordingly, the loss due to the impedance mismatching can be reduced by appropriately adjusting the stubs. Therefore, the gain can be secured in a broad frequency band, and therefore, it becomes possible to broaden the frequency band width of a radio wave being radiated. Specifically, this facilitates the realization of a desired frequency band width for the polarized wave in the Y-axis direction for which the parasitic element is not provided because of the constraint on the size of the dielectric substrate 130.

Note that in FIGS. 11A and 11B, the stubs 141 are provided in the feed line 140X for the polarized wave in the X-axis direction for which the parasitic elements 122X are provided. However, in the case where a desired frequency band width can be realized using the parasitic element 122X, there is no need to provide the stubs 141. Furthermore, in the cross-sectional view of FIG. 11B, for ease of understanding of the connecting positions of the stubs in the feed line, the stub is illustrated in such a manner as to have a thicker thickness than the thickness of the feed line. However, the thickness of the stub may be the same as the thickness of the feed line.

Embodiment 5

In the embodiments described above, the examples are described in which the antenna device includes, as the radiating element, the feed element and the parasitic element arranged on the same layer as the feed element.

In the embodiment 5, an example of a so-called stack type antenna device, in which the passive element and the feed element are arranged on or in different layers of the dielectric substrate, is described.

First Example

Figure 12A:
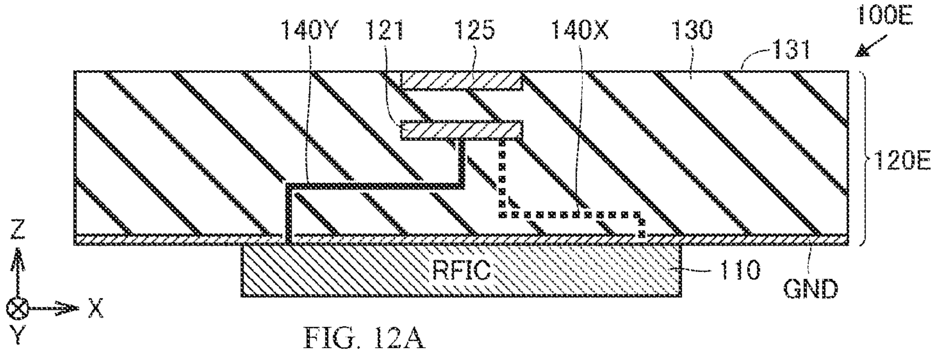
FIGS. 12A, 12B, 12C and 12D illustrate cross-sectional views of a first example of an antenna module including an antenna device according to an embodiment 5.
Figure 12B:
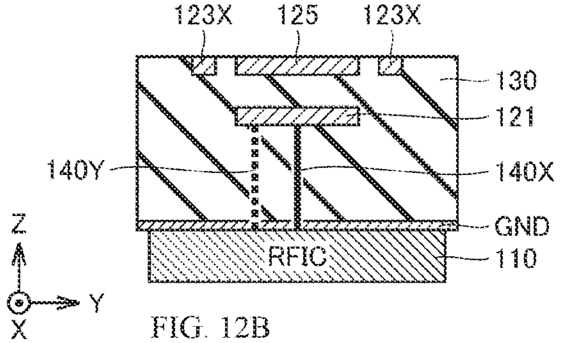
Figure 12C:
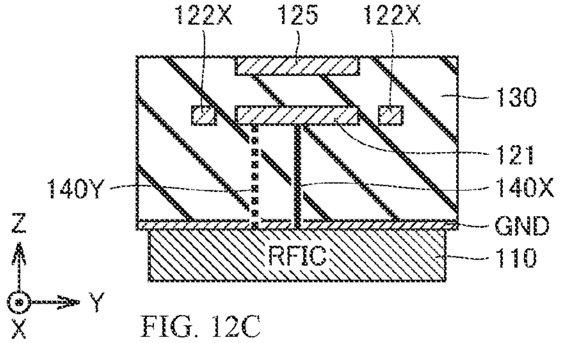
Figure 12D:
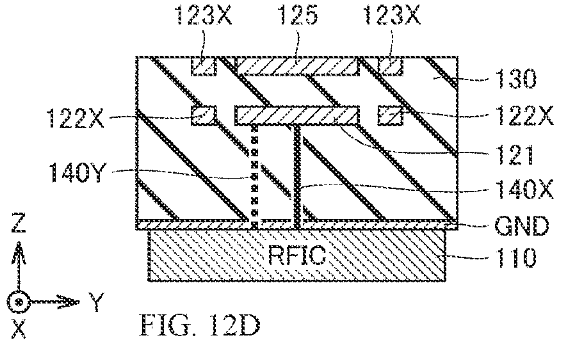

FIGS. 12A, 12B, 12C and 12D illustrate cross-sectional views illustrating an antenna module 100E including an antenna device 120E according to the first example of the embodiment 5. FIG. 12A is a view corresponding to FIG. 2B of the embodiment 1 and is a cross-sectional view at line I-I that passes through the feed point SPX. Each of FIG. 12B to FIG. 12D is a view corresponding to FIG. 2C of the embodiment 1 and is a cross-sectional view at line II-II that passes through the feed point SPY. Note that in FIGS. 12A, 12B, 12C and 12D, a plan view of the antenna device 120E is not illustrated. However, the size of the dielectric substrate 130 is substantially the same as that of FIG. 2A of the embodiment 1.

Referring to FIGS. 12A, 12B, 12C and 12D, in the antenna device 120E, the feed element 121 is arranged on or in an inner layer of the dielectric substrate 130. The antenna device 120E further includes a passive element 125 arranged on the top surface 131 of the dielectric substrate 130. Note that the passive element 125 may not be necessarily exposed from the dielectric substrate 130. In other words, the feed element 121 is formed on or in a layer located between the layer where the passive element 125 is formed and the layer where the ground electrode GND is formed.

The passive element 125 has a substantially square plane shape. The size of the passive element 125 is equal to the size of the feed element 121 or smaller than the size of the feed element 121. In the plan view of the antenna device 120E from the normal direction of the dielectric substrate 130, at least part of the passive element 125 overlaps the feed element 121. Alternatively, the shape of the passive element 125 may be a substantially non-square rectangular shape.

In the antenna device 120E, the passive element 125 is set in such a manner as to have the same resonant frequency as the feed element 121. By employing such configuration, it becomes possible to broaden the frequency band width of a radio wave being radiated from the radiating element.

Furthermore, in the antenna device 120E, parasitic elements are arranged for the polarized wave whose excitation direction is in the X-axis direction. The parasitic element may be arranged in such a manner as to face a side of the passive element 125 along the X-axis direction as in parasitic elements 123X in the example of FIG. 12B or may be arranged in such a manner as to face a side of the feed element 121 along the X-axis direction as in parasitic elements 122X in the example of FIG. 12C. Alternatively, as in the example of FIG. 12D, both the parasitic elements 122X and the parasitic elements 123X may be arranged.

Even in the antenna device 120E, the beam width of the polarized wave whose excitation direction is in the Y-axis direction may be limited by the constraint on the size of the dielectric substrate 130. Accordingly, in both the feed element 121 and the passive element 125, no parasitic element is provided for the polarized wave whose excitation direction is in the Y-axis direction, and this enables to secure the beam width and realize a desired gain.

Second Example

Figure 13A:
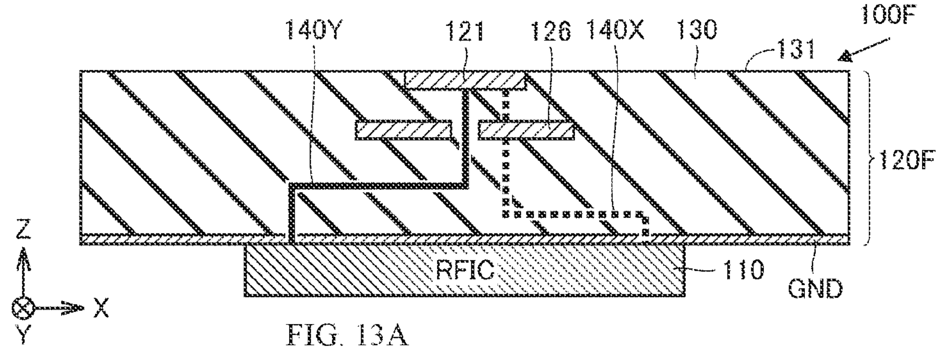
FIGS. 13A, 13B, 13C and 13D illustrate cross-sectional views of a second example of the antenna module including the antenna device according to the embodiment 5.
Figure 13B:
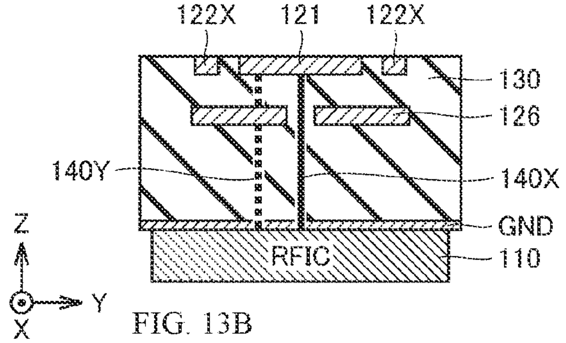
Figure 13C:
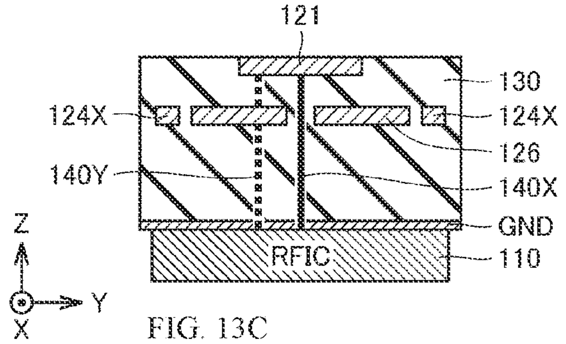
Figure 13D:
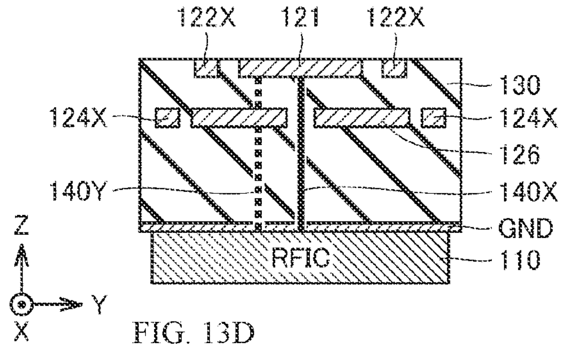

FIGS. 13A, 13B, 13C and 13D illustrate cross-sectional views illustrating an antenna module 100F including an antenna device 120F according to the second example of the embodiment 5. With regard to FIGS. 13A, 13B, 13C and 13D, as in the case of FIGS. 12A, 12B, 12C and 12D, FIG. 13A is a view corresponding to FIG. 2B in the embodiment 1, and each of FIG. 13B to FIG. 13D is a view corresponding to FIG. 2C in the embodiment 1. Furthermore, the dielectric substrate 130 has substantially the same size as the dielectric substrate 130 of FIG. 2A of the embodiment 1.

Referring to FIGS. 13A, 13B, 13C and 13D, in the antenna device 120F, the feed element 121 is arranged on the top surface 131 of the dielectric substrate 130. The antenna device 120F further includes a passive element 126 formed on or in a layer located between the layer where the feed element 121 is formed and the layer where the ground electrode GND is formed. The passive element 126 has a substantially square plane shape and has a larger size than the feed element 121. In the plan view of the antenna device 120F from the normal direction of the dielectric substrate 130, at least part of the passive element 126 overlaps the feed element 121. Alternatively, the shape of the passive element 126 may be a substantially non-square rectangular shape.

In the antenna device 120F, the passive element 126 is set in such a manner as to have a resonant frequency different from that of the feed element 121. Furthermore, each of the feed lines 140X and 140Y that sends a radio frequency signal to the feed element 121 passes through the passive element 126 and is connected to the feed element 121. Employing such configuration enables the passive element 126 to radiate a radio wave of a frequency band different from that of the feed element 121. That is to say, the antenna device 120F functions as a dual-band type antenna device.

Furthermore, in the antenna device 120F, parasitic elements are arranged for the polarized wave whose excitation direction is in the X-axis direction. In the example of FIG. 13B, the parasitic elements 122X are each arranged in such a manner as to face a side of the feed element 121 along the X-axis direction. In the example of FIG. 13C, parasitic elements 124X are each arranged in such a manner as to face a side of the passive element 126 along the X-axis direction. In the example of FIG. 13D, the parasitic elements 122X and the parasitic elements 124X are arranged for the feed element 121 and the passive element 126, respectively.

Even in the antenna device 120F, the beam width of the polarized wave whose excitation direction is in the Y-axis direction may be limited by the constraint on the size of the dielectric substrate 130. Accordingly, in both the feed element 121 and the passive element 126, no parasitic element is provided for the polarized wave whose excitation direction is in the Y-axis direction, and this enables to secure the beam width and realize a desired gain.

Note that even a stack type antenna device such as the ones in the embodiment 5 can be configured as array antennas such as the ones in the embodiments 2 and 3, and can also be configured to include the stubs as in the embodiment 4.

Note that in the antenna modules described above, the configurations are described in which the radiating element (feed element, passive element, and parasitic element) is arranged on the top surface of a common dielectric substrate and/or in the inside of the common dielectric substrate. Alternatively, the configuration may be such that part or whole of the radiating element is arranged in a member different from the dielectric substrate (for example, a housing of a communication device). Furthermore, without using the dielectric substrate, an antenna module may be formed by arranging only electrodes.

Furthermore, the parasitic element may be arranged at a position whose distance from the ground electrode is different from that of the feed element (that is, a layer that is different from the layer where the feed element is arranged), provided that the parasitic element can electromagnetically couple with the feed element.

Furthermore, the feed line that supplies a radio frequency signal to the feed element may be configured in such a way that at least part of the feed line and the feed element are formed on or in the same layer.

It is to be understood that the embodiments described in the present disclosure are exemplary in all aspects and are not restrictive. It is intended that the scope of the present disclosure is defined by the claims, not by the description of the embodiments described above, and includes all variations which come within the meaning and range of equivalency of the claims.

10 Communication device, 100, 100D-100F Antenna module, 110 RFIC, 111A-111D, 113A-113D, 117 Switch, 112AR-112DR Low noise amplifier, 112AT-112DT Power amplifier, 114A-114D Attenuator, 115A-115D Phase shifter, 116 Signal multiplexer/demultiplexer, 118 Mixer, 119 Amplifier circuit, 120, 120A-120F Antenna device, 121 Feed element, 122X, 122XA, 122Y, 123X, 124X Parasitic element, 125, 126 Passive element, 130 Dielectric substrate,

140X, 140Y Feed line, 141, 142 Stub, 200 BBIC, GND Ground electrode, SPX, SPY Feed point.

The invention claimed is:

1. An antenna device comprising:

a ground electrode having a first side extending in a first direction and a second side extending in a second direction, the second direction being intersecting the first direction;

a first feed conductor;

a passive circuit element;

a first parasitic circuit element facing a side of the first feed conductor, the side of the first feed conductor being parallel to the first side, as seen in a plan view of the antenna device, wherein as seen in the plan view, the first parasitic circuit element is located on a straight line that passes through the center of the first feed conductor and that is parallel to the second direction; and a feed line configured to send a radio frequency signal to the first feed conductor, wherein the feed line comprises a stub, and wherein the passive circuit element has a different resonant frequency than the first feed conductor.

2. The antenna device according to claim 1, wherein the passive circuit element has a substantially rectangular planar shape, and wherein at least part of the passive circuit element overlaps the first feed conductor as seen in the plan view.

3. The antenna device according to claim 2, further comprising:

a second parasitic circuit element facing a side of the passive circuit element, the side of the passive circuit element being parallel to the first side as seen in the plan view.

4. The antenna device according to claim 2, wherein:

the passive circuit element is between the first feed conductor and the ground electrode, and the feed line passes through the passive circuit element and is connected to the first feed conductor.

5. The antenna device according to claim 2, wherein the first feed conductor is between the passive circuit element and the ground electrode.

6. The antenna device according to claim 1, further comprising:

a dielectric substrate, wherein:

the first feed conductor and the ground electrode are arranged on or in the dielectric substrate, and a length of the second side is greater than $\lambda g/2$ and less than $\lambda g$, where $\lambda g$ is an effective wavelength of a radio wave being radiated from the first feed conductor in the dielectric substrate.

7. The antenna device according to claim 1, wherein the first feed conductor is configured to radiate a first polarized wave that is excited in the first direction and a second polarized wave that is excited in the second direction.

8. The antenna device according to claim 1, wherein a length of the first side is longer than a length of the second side.

9. The antenna device according to claim 1, wherein, as seen in a plan view of the antenna device, there is no parasitic circuit element parallel to the second side.

10. The antenna device according to claim 1, further comprising:

a second feed conductor having a planar shape, wherein a normal direction of the second feed conductor is different than the normal direction of the first feed conductor.

11. The antenna device according to claim 10, further comprising:

a dielectric substrate comprising a first part and a second part, wherein:

the second part is bent from the first part, and the first feed conductor is arranged on or in the second part, and the second feed conductor is arranged on or in the first part.

12. The antenna device according to claim 1, comprising:

a plurality of the first feed conductors arranged in an array shape such that each side of each first feed conductors is parallel to the first direction or the second direction; and a plurality of the parasitic circuit elements each facing the side of a corresponding one of the plurality of first feed conductors, the sides of each of the corresponding ones of the plurality of first feed conductors being parallel to the first side, as seen in a plan view of the antenna device.

13. The antenna device according to claim 12, further comprising:

at least one second feed conductor having a planar shape, wherein a normal direction of the at least one second feed conductor is different than the normal direction of each of the plurality of first feed conductors.

14. The antenna device according to claim 13, further comprising:

a dielectric substrate comprising a first part and a second part, wherein:

the second part is bent from the first part, and the plurality of first feed conductors is arranged on or in the second part, and the at least one second feed conductor is arranged on or in the first part.

* * * * *